Figure 1:
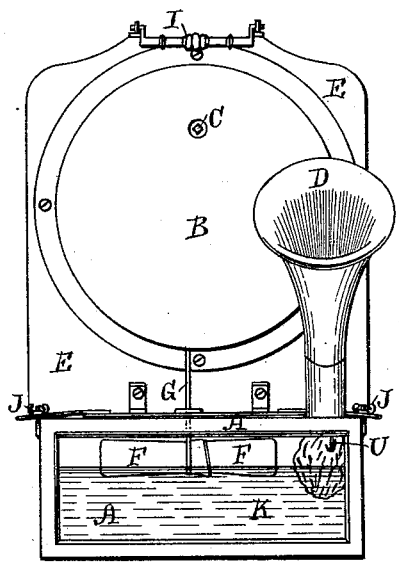

(No Model.) 2 Sheets—Sheet 1.
H. & T. A. CARTER.
APPARATUS FOR THE VENTILATING, REFRIGERATING, HEATING, &c.,
OF CARRIAGES, HALLS, OR ROOMS.

No. 484,353. Patented Oct. 11, 1892.

WITNESSES:
Chas. H. Luther Jr
Henry J. Miller

INVENTORS:
Henry Carter
Thomas A. Carter
by Joseph H. Miller & Co.
Attys.

(No Model.) 2 Sheets—Sheet 2.

H. & T. A. CARTER.
APPARATUS FOR THE VENTILATING, REFRIGERATING, HEATING, &c., OF CARRIAGES, HALLS, OR ROOMS.

No. 484,353. Patented Oct. 11, 1892.

WITNESSES:
Chas. H. Luther Jr.
Henry J. Miller

INVENTORS.
Henry Carter
and Thomas A. Carter
by Joseph A. Miller & Co.
Attys.

United States Patent Office.

HENRY CARTER AND THOMAS ALFRED CARTER, OF BRISTOL, ENGLAND, ASSIGNORS, BY MESNE ASSIGNMENTS, TO THE HOLMES MANUFACTURING COMPANY, OF PROVIDENCE, RHODE ISLAND.

APPARATUS FOR THE VENTILATING, REFRIGERATING, HEATING, &c., OF CARRIAGES, HALLS, OR ROOMS.

SPECIFICATION forming part of Letters Patent No. 484,353, dated October 11, 1892.

Application filed November 4, 1891. Serial No. 410,825. (No model.) Patented in England December 30, 1887, No. 17,929.

*To all whom it may concern:*

Be it known that we, HENRY CARTER and THOMAS ALFRED CARTER, both of the city and county of Bristol, England, have invented certain new and useful Improvements in Apparatus for the Ventilating, Refrigerating, Heating, and the Like of Public and Private Carriages, also Applicable to Halls or Rooms, (patented in England December 30, 1887, No. 17,929;) and we hereby declare that the following is a full, clear, and exact description of the same, reference being had to the accompanying drawings, forming part of this specification.

In carrying our invention into practice we fit in the upper portion of the machine or apparatus a fan or bellows which is actuated by a spring or by any other suitable motive power to rapidly revolve a fan or cause to blow by a bellows, which has the effect of driving a current of air briskly upon the surface of the liquid stored at the base. The liquid may consist of any disinfectant or water of any kind which may be considered necessary in the form of vapor, and then passes through a tube into the room or carriage. Ice may be used in the liquid for cooling purposes, and a bath of water mixed with sea-salt may be used, which we consider has a tendency to arrest impurities, or any disinfectant liquid of choice. A sponge saturated with perfume, or disinfectant if necessary, is so placed in the liquid-container that the air receives the perfume or disinfectant after the air has been purified and cleansed from dust, insects, &c., before being received by the occupants of rooms, carriages, halls, &c. Instead, however, of placing the sponge or other medium for carrying the material required to be diffused within, a separate chest or container may be placed in the upper part of the liquid-container or in any suitable position. A case or container for the liquid is connected with the fan or bellows chamber by a pipe or tube, which pipe passes to the surface of the liquid. When the fan or bellows is in operation, the air is driven through the pipe from the fan or bellows chamber into the liquid-container. This disturbs the liquid or bath by causing a hollow place and waves to be made on the surface of the liquid, and the air becomes deprived of the particles of dust and other substances which it contains and may be made scented or disinfectant by the medium for carrying the material, as described. The force being broken by the liquid receiving the pressure of air the air enters the room, carriage, or place from the liquid-container imperceptibly without any undue draft through the air-diffuser fresh with an agreeable fragrance. A fan or other suitable means of propelling the air may be fixed inside or adjoining the liquid-container, whereby the issuing volume of air is divided into thin streams of fine jets by passing through the disturbed liquid and then forced from the liquid-container to the air-diffuser and may carry with it any scent, disinfectant, &c., as described.

Figure 2:
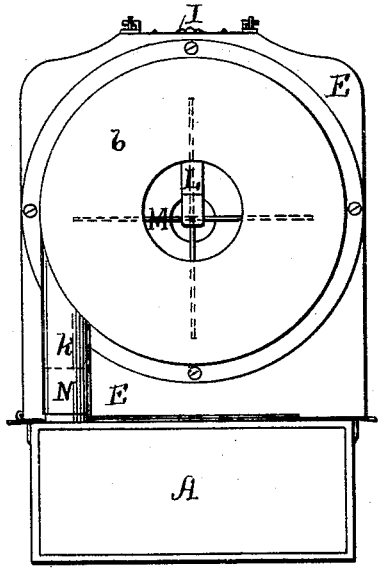
Figure 3:
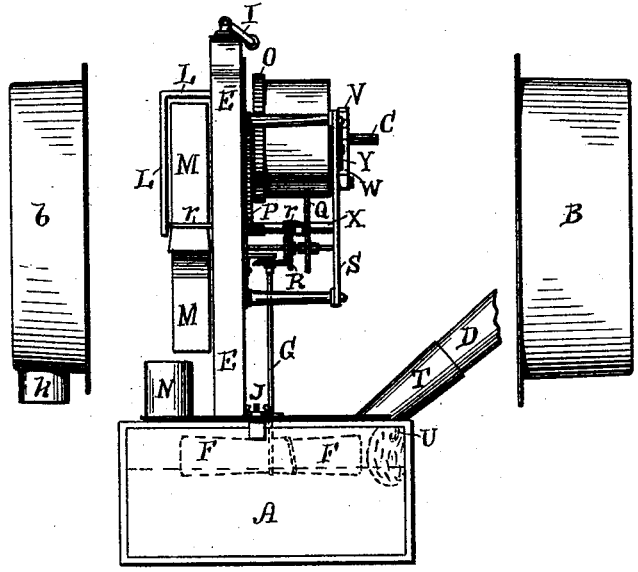
Figure 4:
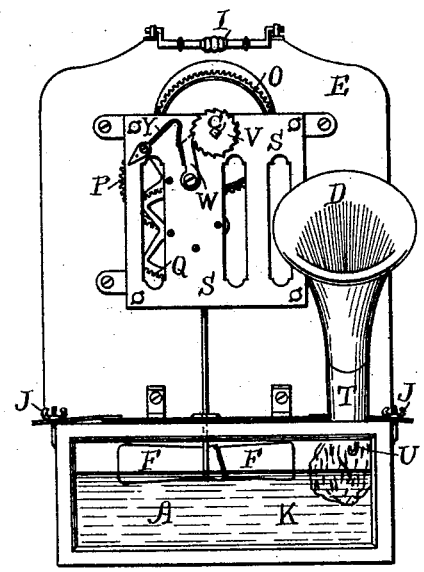

Figure 1 represents a front view of the improved device, Fig. 2 being a back view thereof. Fig. 3 represents a side view of the same, the casing of the clockwork being removed to more clearly show the construction. Fig. 4 represents a front view of the device with the clockwork removed.

Similar letters of reference designate corresponding parts throughout.

In the drawings, A indicates the liquid-container, which may have a glass panel and is provided with a fan F, carried on the vertical shaft G, journaled in the top of the container. To this top is also secured the standard E, and at one side of the top is a perforation, around which is secured the tube N.

Journaled in the standard E and in the lower end of the bracket L is a horizontal shaft $r$, which has a pinion adapted to be engaged and driven by a clockwork, and at the opposite end is secured to the vertical fan M, this fan being inclosed in the case $b$, having a depending tube $k$, which enters the upper end of the tube N to direct the flow of air into the liquid-containing chamber A, air being admitted to this case $b$ through small perforations in the sides thereof.

The clockwork for imparting motion to the fans F and M is supported in a frame secured to the standard E on the side opposite to the fan M, and is covered by the case B, and is driven by a spring contained within a barrel adapted to be wound by a key fitting the square arbor C, secured to which is a ratchet V, with the teeth of which the pawl W engages and prevents the backward rotation of the arbor. The barrel has a large gear O, which engages with a pinion on the shaft which carries the gear P, this gear engaging with a pinion on a shaft to which the gear Q is secured, and the gear Q in turn engaging a gear secured to a shaft on which is carried a gear R, which engages with the pinion of the shaft r and by a beveled gear secured to the gear R, with the beveled gear secured to the upper end of the shaft G.

The liquid-containing chamber may be provided with a hook U for supporting a sponge near the opening to the tube T, to the outer end of which the trumpet-shaped diffuser D is secured.

Having thus described our invention, we claim as new and desire to secure by Letters Patent—

1. In an air-purifying device, the combination, with a liquid-containing reservoir having an inlet and an outlet, a vertical rotatable shaft journaled in the top of said reservoir, and a horizontal fan secured to the lower end of said shaft, of a standard secured to said reservoir, an air-chamber secured to one side thereof and connected with the reservoir, a vertical rotatable fan carried by a shaft extending through said standard, and a clock mechanism secured on the other side of said standard adapted to rotate said shafts, as described.

2. The combination, with the liquid-containing reservoir A, having the inlet N and outlet T, and the standard E, supported thereby, a suitable clockwork secured to said standard, the horizontal shaft r, extending through said standard and provided with a gear engaging with the clock mechanism, the vertical shaft G, extending into the reservoir, suitably journaled and provided with a gear intermeshing with the gear R of the clockwork, of the fan M, carried on the shaft r, a casing b, covering said fan and connected with the reservoir A, and a fan F, contained within said reservoir and carried by the shaft G, as and for the purpose described.

HENRY CARTER.
THOMAS ALFRED CARTER.

Witnesses:
   THOS. W. JACQUES,
   JOHN WM. FREDK. JACQUES,
          Solicitors, Bristol.